United States Patent

[11] 3,578,199

| [72] | Inventor | Allen B. Duncan<br>327 W. Wooster St., Bowling Green, Ohio 43402 |
|---|---|---|
| [21] | Appl. No. | 814,624 |
| [22] | Filed | Apr. 9, 1969 |
| [45] | Patented | May 11, 1971 |

[54] PORTABLE CARRIER FOR BEVERAGE CONTAINERS
5 Claims, 5 Drawing Figs.

[52] U.S. Cl. .................................................. 220/31,
220/63, 220/85, 224/26, 224/311
[51] Int. Cl. ........................................................ B65d 25/14,
B65d 43/16
[50] Field of Search........................................ 220/9(F),
9, 15, 38.5, 31, 60, 18, 24, 63, 85; 224/5.5, 29.2,
26; 206/4; 248/304, 305, 311, 309

[56] References Cited
UNITED STATES PATENTS

| 2,842,277 | 7/1958 | Jewell | 248/318UX |
|---|---|---|---|
| 2,988,315 | 6/1961 | Saxe | 248/304X |
| 3,071,282 | 1/1963 | Walters | 220/9 |
| 3,086,674 | 4/1963 | Scheuerman | 220/24 |
| 3,093,238 | 6/1963 | King III | 206/4 |
| 3,187,886 | 6/1965 | Honey | 206/1 |
| 3,263,806 | 8/1966 | Ring | 224/26X |
| 3,456,833 | 7/1969 | Cornelius | 220/9(F) |

*Primary Examiner*—Raphael H. Schwartz
*Attorney*—Freeman & Taylor

ABSTRACT: A lightweight portable insulated carrier adapted to carry drink containers, such as cans, consisting of an elongate hollow tubular insulated body with closure members attached to each end thereof, the closure members being hinged and adapted to be moved between open and closed positions for access to the interior of the body and releasable means are carried by the body for mounting the carrier on a suitable supporting member such as the handle of a golf cart for example, the closure members being insulated and locking means being provided so that the interior of the container can be securely closed off and insulated.

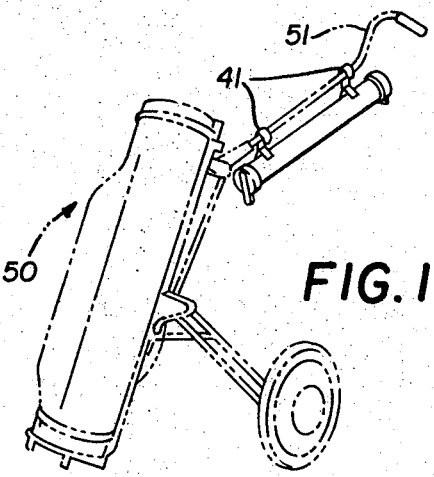
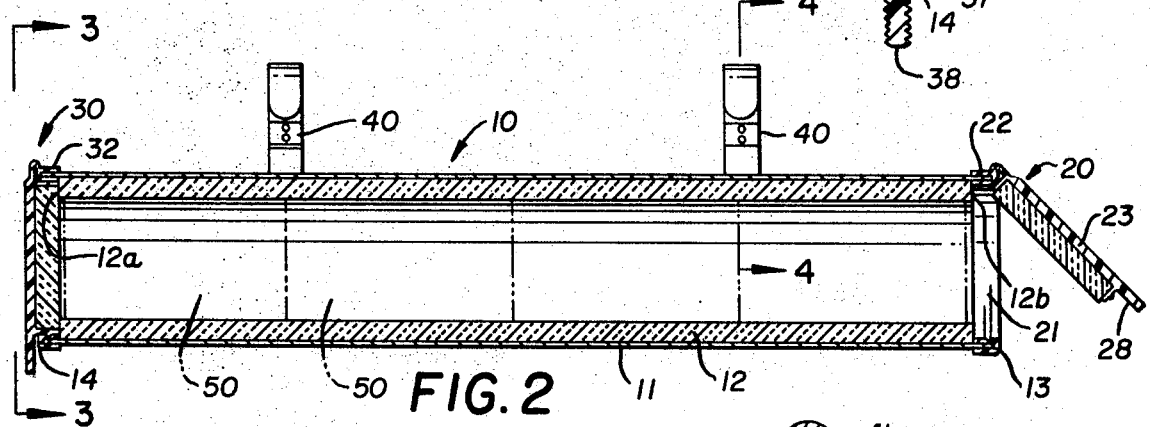
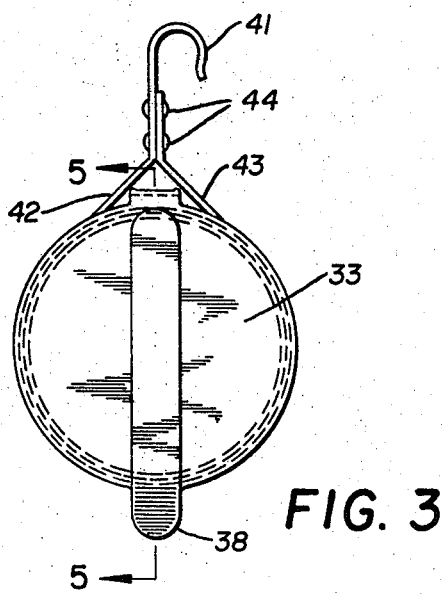
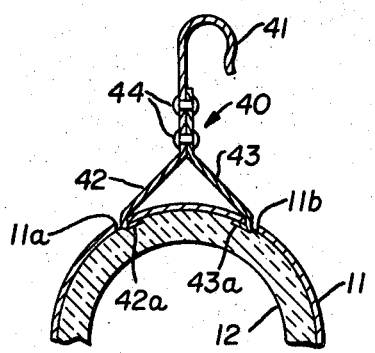
Patented May 11, 1971 — 3,578,199
FIG. 1
FIG. 2
FIG. 3
FIG. 4
FIG. 5
INVENTOR.
ALLEN B. DUNCAN
BY Freeman & Taylor
ATTORNEYS

PORTABLE CARRIER FOR BEVERAGE CONTAINERS

BACKGROUND OF THE INVENTION

This invention primarily relates to a carrier for cans of chilled or iced beverages such as soft drinks or beer for example. The device could also be used with bottled beverages but is primarily designed for use with cans. In general, the device has particular applicability to utilization in conjunction with golf carts but could, of course, be utilized in any situation in which portability and insulation are desirable features.

DESCRIPTION OF THE PRIOR ART

Applicant is aware of the following prior art: Alliger U.S. Pat. No. 458,264, Domagall U.S. Pat. No. 2,474,934, Walters U.S. Pat. No. 3,071,282;

Of these patents, Alliger is not insulated and its cover is not capable of being locked nor is there any way to support the receptacle. Domagall relates to a receptacle for liquids, is not insulated and has a very complex locking structure. Walters does show an insulated container but is only open at one end, has no means for support and has an expensive thread arrangement for locking purposes.

Therefore, it is believed that none of the art of which Applicant is aware shows a lightweight, low cost carrier such as is disclosed in this application.

SUMMARY OF THE INVENTION

It has been discovered that canned beverages such as soft drinks or beer can be readily transported in a hollow tubular container including a rigid shell and an insulating lining while retaining the desired temperature thereof.

It has further been discovered that by providing insulated closure members on the opposed ends of the container, that access to the interior thereof is facilitated both for the purposes of loading the same with full cans and unloading the same of empty cans.

It has further been discovered that utilization of the portable container can be enhanced by providing supporting elements on the container which enable the same to be attached to a supporting member such as the handle of a golf cart for example. The fact that closure members are located on each end also enables the container to be used without regard to which end is uppermost when it is in supported condition.

In this regard, it has also been discovered that shipping of the unit can be facilitated by making the supporting straps easily detachable from the body of the container.

Accordingly, production of an improved carrier of the character described becomes the principal object of this invention with other objects thereof becoming more apparent upon a reading of the following brief specification, considered and interpreted in view of the accompanying drawings.

OF THE DRAWINGS

FIG. 1 is a perspective view of the improved carrier showing the same mounted on a golf cart handle with the golf cart being shown in phantom lines for purposes of illustration.

FIG. 2 is a side elevational view taken along a section through the longitudinal axis thereof.

FIG. 3 is an end elevation of the improved carrier taken along the lines 3—3 of FIG. 2.

FIG. 4 is a sectional view showing the hanger means taken along the lines 4—4 of FIG. 2.

FIG. 5 is an enlarged partial sectional view taken along the lines 5—5 of FIG. 3.

Considering first then FIG. 2 for a general description of the improved carrier, it will be seen that the carrier generally includes a body 10, opposed end closure members 20 and 30 and carrier straps 40, 40.

The body 10 is generally in the form of an elongate hollow tube constructed of a relatively rigid, thin, lightweight shell 11 which has an interior lining 12 of styrofoam or some similar suitable light insulating material bonded to the interior of the shell 11 in conventional fashion and terminating short of the ends of the shell in shoulders 12a and 12b for purposes which will be described below. The end closure members 20 and 30 each include circular rims 21 and 31 which are generally U-shaped in cross section with the space between the legs of the U generally conforming to the thickness dimension of the shell 11 so that the rim can be snugly telescoped onto the opposed ends of the shell.

Considering FIG. 5 with regard to the detailed construction of the closure members 20 and 30, it will be seen that in addition to the rim 31, the closure member 30, for example, also includes a cover piece 33 which, in turn, includes a hinge piece 34 which integrally connects rim 31 and cover piece 33 so that the cover pieces may be opened as shown with regard to closure member 20 in FIG. 2.

Cover piece 33 also includes an annular shoulder 35 which has an exterior dimension slightly less than the interior dimension of the rim 31 so that the same may be received within the rim as shown in FIGS. 2 and 5. Cover 33 also has bonded to its inner surface insulating material 34 so that when the cover is closed, as shown in FIG. 5, material 34 abuts shoulders 12a and 12b and a complete closure of the interior of the tube will be provided so that insulation of the interior will be substantially complete.

Shoulder 35 also includes a ridge 36 on part of its periphery while the inner surface of the rim 31 includes a corresponding notch 37. It should be noted here that these parts could, of course, be reversed if desired. Since the cover 33 and rim 31 are generally made of lightweight material or plastic having some resiliency it will be seen that ridge 36 will readily snap into groove 37 upon the application of vary slight pressure and will hold the cover 30 in place in the closed position in FIG. 5.

The cover pieces 23 and 33 are also provided with lifting means 28 and 38 which are elongate plates having one end projecting beyond the periphery of the cover pieces and having a knurled surface for easy gripping. These lifting means may be integral with cover 33 as shown or could be separate pieces welded or otherwise secured to the cover.

Turning next then to the carrying straps 40,40, reference is made to FIGS. 3 and 4 in particular in which it will be seen that strap 40 includes a hook member 41 secured to a Y-shaped attachment piece by rivets 44,44. The attachment piece has diverging legs 42 and 43 which terminate in return flanges 42a and 43a as clearly shown in FIG. 4.

The shell 11 has appropriate longitudinal notches 11a and 11b cut therein and it is intended that the device would be shipped without the straps 40,40 being positioned so that a minimum amount of shipping space will be utilized. Assembly is easily accomplished by merely snapping flanges 42a and 43a into the notches 11a and 11b. Since the insulating material 12 is relatively soft and the strap 40 is metal or plastic, it is believed apparent that the flanges 42a,43a will be capable of penetrating the insulating material to the degree sufficient to lock the straps in place without impairing the insulating properties of the container.

In use or operation of the improved device, it will be assumed that the same has been assembled to the condition shown in FIG. 2 at which time one end closure member 20 may be opened and a plurality of cans 50,50 can be inserted into the inside. Assuming that the cans have been chilled prior to insertion, once the end closure member 20 is closed, the insulating material should maintain the cans at the desired temperature for a reasonable period of time. The entire device then can be attached to golf cart 50 by slipping the hook portions 41,41 of straps 40,40 over the handle 51 of the cart.

When it is desired to remove one of the cans from the carrier, it is merely necessary to open the lower end of the device and the bottom can will automatically fall into the user's hand. Used or empty cans can be reinserted through the top closure member to avoid any problem of litter.

It has been shown, therefore, how a portable, lightweight simplified carrier can be provided for transporting cans of beverages and retaining them in at the desired temperature.

It should be noted here that, while the carrier has been shown utilized with a golf cart, that it is by no means intended to be limited to such an application and the invention has utility any place insulation and portability are desired.

While a full and complete description of the invention has been set forth in accordance with the dictates of the Patent Statutes, it should be understood that modifications may be resorted to without departing from the spirit thereof or the scope of the appended claims.

I claim:

1. A portable carrier of the character described, comprising;
   A. an elongate hollow tubular body;
   B. insulating means lining the interior of said body;
   C. a pair of end closure members
      1. hingedly connected to said body and
      2. adapted to be moved selectively between open and closed positions
         a. whereby the ends of said body may be sealed off by said closure members
      3. said closure members being insulated;
   D. locking means for retaining said closure members in closed position with respect to the ends of said body;
   E. carrying means adapted to be releasably secured to said body and projecting substantially normally to the longitudinal axis of said body;
   F. said body including a thin rigid elongate shell;
   G. said closure members each including a circular rim; and
   H. said rims having a U-shaped cross section and being adapted to fit snugly over the opposed ends of said shell.

2. The device of claim 1 further characterized by the fact that said closure members each include a cover piece hinged to said rim and having a depending shoulder with a slightly smaller outside diameter than the inside diameter of said rim.

3. The device of claim 2 further characterized by the fact that said locking means include complemental ridge and groove means carried by said rim and said shoulder.

4. The device of claim 2 further characterized by the presence of an opening handle carried by each said cover piece.

5. A portable carrier of the character described, comprising;
   A. an elongate hollow tubular body;
   B. insulating means lining the interior of said body;
   C. a pair of end closure members
      1. hingedly connected to said body and
      2. adapted to be moved selectively between open and closed positions
         a. whereby the ends of said body may be sealed off by said closure members
      3. said closure members being insulated;
   D. locking means for retaining said closure members in closed position with respect to the ends of said body;
   E. carrying means adapted to be releasably secured to said body and projecting substantially normally to the longitudinal axis of said body;
   F. said body including a thin rigid elongate shell having spaced elongate axially extending notches therein; and
   G. said releasable carrying means including attachment means with divergent legs, the ends of which are adapted to releasably engage said notches.